(12) United States Patent
Gagne et al.

(10) Patent No.: US 11,220,320 B2
(45) Date of Patent: Jan. 11, 2022

(54) LATERAL PROPULSION SYSTEMS AND ARCHITECTURES FOR HIGH ALTITUDE BALLOONS

(71) Applicant: Aerostar International, Inc., Sioux Falls, SD (US)

(72) Inventors: Jacques Gagne, Los Gatos, CA (US); Matthew Knoll, Mountain View, CA (US); Daniel Alex Luebke, San Mateo, CA (US); Jonathan Nutzmann, Redwood City, CA (US); Michael Eglington, San Bruno, CA (US); Sameera Ponda, Mountain View, CA (US); Aaron Fan, Redwood City, CA (US); Ewout van Bekkum, Sunnyvale, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 114 days.

(21) Appl. No.: 16/513,782

(22) Filed: Jul. 17, 2019

(65) Prior Publication Data

US 2021/0016865 A1 Jan. 21, 2021

(51) Int. Cl.
*B64B 1/30* (2006.01)
*B64B 1/44* (2006.01)
*B64D 35/00* (2006.01)

(52) U.S. Cl.
CPC .............. *B64B 1/30* (2013.01); *B64B 1/44* (2013.01); *B64D 35/00* (2013.01); *B64D 2211/00* (2013.01)

(58) Field of Classification Search
CPC .... B64B 1/30; B64B 1/24; B64B 1/26; B64B 1/28; B64B 1/32; B64B 1/36; B64B 1/44; B64D 2211/00; B64D 35/00
See application file for complete search history.

(56) References Cited

U.S. PATENT DOCUMENTS 1,825,184 A    9/1931   Ignatz
3,069,114 A * 12/1962   Maas ...................... B64B 1/58
                                                              244/31

(Continued)

FOREIGN PATENT DOCUMENTS

CN           205239886 U    5/2016
WO    WO2014031375 A1    2/2014

(Continued)

OTHER PUBLICATIONS

International Search Report and Written Opinion for Application No. PCT/US20/35173 dated Sep. 15, 2020.

(Continued)

*Primary Examiner* — Christopher D Hutchens
(74) *Attorney, Agent, or Firm* — Schwegman Lundberg & Woessner, P.A.

(57) ABSTRACT

Aspects of the technology relate to propulsion systems for high altitude, long duration balloons, such as balloons that operate in the stratosphere for weeks, months or longer. A propeller assembly is used to provide lateral directional adjustments, which allows the balloon to spend more time over a desired region, reduce the return time to the desired region, reduce fleet overprovisioning, and increases the safety case by additional controls and avoidance abilities. A control assembly manages operation of the propeller assembly, including setting the pointing direction, speed of rotation and determining when to turn on the propeller and for how long. The propulsion system including the control and propeller assemblies is rotatable around a connection member of the balloon. Such rotation is independently adjustable from any rotation of the balloon's payload. The propeller blades may be made of plastic, which reduces weight and cost while providing sufficient speed at stratospheric altitudes.

26 Claims, 13 Drawing Sheets

(56) References Cited

U.S. PATENT DOCUMENTS

| | | | |
|---|---|---|---|
| 3,976,265 A | 8/1976 | Doolittle | |
| 4,204,656 A * | 5/1980 | Seward, III | B64B 1/24 244/190 |
| 4,605,355 A | 8/1986 | Davis et al. | |
| 4,934,631 A | 6/1990 | Birbas | |
| 4,984,757 A * | 1/1991 | Hartung | B64D 1/22 144/24.13 |
| 4,995,572 A | 2/1991 | Piasecki | |
| 5,906,335 A * | 5/1999 | Thompson | F02B 75/34 244/24 |
| 6,167,263 A | 12/2000 | Campbell | |
| 6,386,480 B1 | 5/2002 | Perry et al. | |
| 6,402,090 B1 | 6/2002 | Aaron | |
| 6,520,824 B1 * | 2/2003 | Caroselli | A63H 27/10 446/225 |
| 6,628,941 B2 | 9/2003 | Knoblach et al. | |
| 7,203,491 B2 | 4/2007 | Knoblach et al. | |
| 7,303,166 B2 * | 12/2007 | Geery | B64D 27/24 244/30 |
| 7,341,223 B2 * | 3/2008 | Chu | B64B 1/14 244/24 |
| 7,356,390 B2 | 4/2008 | Knoblach et al. | |
| 7,469,857 B2 | 12/2008 | Voss | |
| 7,801,522 B2 | 9/2010 | Knoblach et al. | |
| 8,544,788 B1 * | 10/2013 | Capper | B64B 1/28 244/33 |
| 8,820,678 B2 | 9/2014 | Devaul et al. | |
| 8,825,232 B2 | 9/2014 | Knoblach et al. | |
| 8,967,533 B2 | 3/2015 | Devaul et al. | |
| 9,139,279 B2 | 9/2015 | Heppe | |
| 9,296,461 B1 | 3/2016 | Roach | |
| 9,327,619 B2 | 5/2016 | Taylor | |
| 9,327,818 B1 | 5/2016 | Roach | |
| 9,329,600 B2 | 5/2016 | Devaul et al. | |
| 9,409,646 B2 | 8/2016 | Fleck | |
| 9,418,243 B2 | 8/2016 | Bauer et al. | |
| 9,419,902 B1 | 8/2016 | Sites | |
| 9,420,023 B2 | 8/2016 | Ramamurthy et al. | |
| 9,519,045 B2 | 12/2016 | Knoblach et al. | |
| 9,632,503 B2 | 4/2017 | Knoblach et al. | |
| 9,663,227 B1 | 5/2017 | Lema | |
| 9,836,063 B1 | 12/2017 | Bonawitz et al. | |
| 2005/0090972 A1 | 4/2005 | Bodin et al. | |
| 2006/0074557 A1 | 6/2006 | Mulligan et al. | |
| 2008/0011900 A1 | 1/2008 | Quintana | |
| 2009/0072082 A1 | 3/2009 | Arel | |
| 2009/0125163 A1 | 5/2009 | Duggan | |
| 2010/0230968 A1 | 9/2010 | Chernyshov | |
| 2011/0233325 A1 * | 9/2011 | Kramer | B64B 1/22 244/30 |
| 2012/0138733 A1 * | 6/2012 | Hiebl | B64B 1/58 244/30 |
| 2013/0118856 A1 | 5/2013 | Long | |
| 2014/0054412 A1 | 2/2014 | Guetta et al. | |
| 2014/0263823 A1 | 9/2014 | Wang | |
| 2015/0078620 A1 * | 3/2015 | Ledergerber | B64B 1/30 382/103 |
| 2015/0142211 A1 | 5/2015 | Shehata | |
| 2015/0232181 A1 | 8/2015 | Oakley | |
| 2016/0159460 A1 | 6/2016 | Laurenceau et al. | |
| 2016/0202704 A1 * | 7/2016 | Hoheisel | B64B 1/48 701/4 |
| 2016/0288894 A1 | 10/2016 | Sehnert et al. | |
| 2017/0113787 A1 * | 4/2017 | Hein | B64C 39/024 |
| 2017/0277180 A1 | 9/2017 | Baer | |
| 2017/0227965 A1 | 10/2017 | Decenzo et al. | |
| 2017/0297724 A1 | 10/2017 | Leidich et al. | |
| 2019/0152577 A1 * | 5/2019 | Kim | B64B 1/58 |
| 2019/0329855 A1 * | 10/2019 | Vestergaard Frandsen | B64D 27/26 |
| 2020/0031086 A1 | 1/2020 | Paulson et al. | |
| 2020/0094450 A1 | 3/2020 | Cordell et al. | |
| 2020/0165919 A1 | 5/2020 | Le-Meur et al. | |
| 2020/0247561 A1 | 8/2020 | Rivera | |

FOREIGN PATENT DOCUMENTS

| | | |
|---|---|---|
| WO | 2017213706 A1 | 12/2017 |
| WO | WO-2021011097 A1 | 1/2021 |

OTHER PUBLICATIONS

Aaron, K.M. et al., A Method for Balloon Trajectory Control, Global Aerospace Corporation, pp. 1-6, 2000.
Ardema, M.D., Missions and Vehicle Concepts for Modem, Propelled, Lighter-Than-Air Vehicles, AGARD, 1985.
Barnes, et al., AVIATR-Aerial Vehicle for In-situ and Airborne Titan Reconnaissance, pp. 1-74, 2011.
Beemer, J.D., et al., POBAL-S, The Analysis and Design of a High Altitude Airship, pp. 1-183, 1975.
Carten, Andrew S., An Investigation of the Applicability of High Altitude, Lighter-Than-Air (LTA) Vehicles to the Tactical Communications Relay Problem, ADA0033344, 1974, pp. 1-62.
Carten, Andrew S., Proceedings of AFCRL Scientific Balloon Symposium (8th) Held at Hyannis, MA, 1974.
Eppler, R. and Somers, D.M., Aerodynamic Design of a Propeller for High-Altitude Balloon Trajectory Control, NASA, pp. 1-59, 2012.
International Search Report and Written Opinion for Application No. PCT/US2018/051985 dated Jan. 16, 2019.
Knaupp, W., Solar Powered Airship, pp. 1314-1319, 1993.
Leclaire, R., The Powered Balloon System Air Force Cambridge Research Labs., pp. 1-15, Sep. 1972.
Mayer, N.J., Current Developments Lighter Than Air Systems, NASA, 1981.
Petrone, F.J., Wessel, P.R., High Altitude Superpressured Powered Aerostat, Naval Ordnance Lab, pp. 1-32, 1974.
Smith, et al., Development of a Small Stratospheric Station Keeping Balloon System, Japanese Society for Aeronautical and Space Sciences, 2000.
Vorachek, et al., Development of a Free Balloon Propulsion System, Goodyear Aerospace Corp., pp. 1-152, 1973.
Vorachek, J.J., A Comparison of Several Very High Altitude Station Keeping Balloon Concepts, pp. 1-28, Jun. 1970.
Wu, G., et al., A Broadband Wireless Access System Using Stratospheric Platforms, pp. 225-230, 2000.

* cited by examiner

100

400

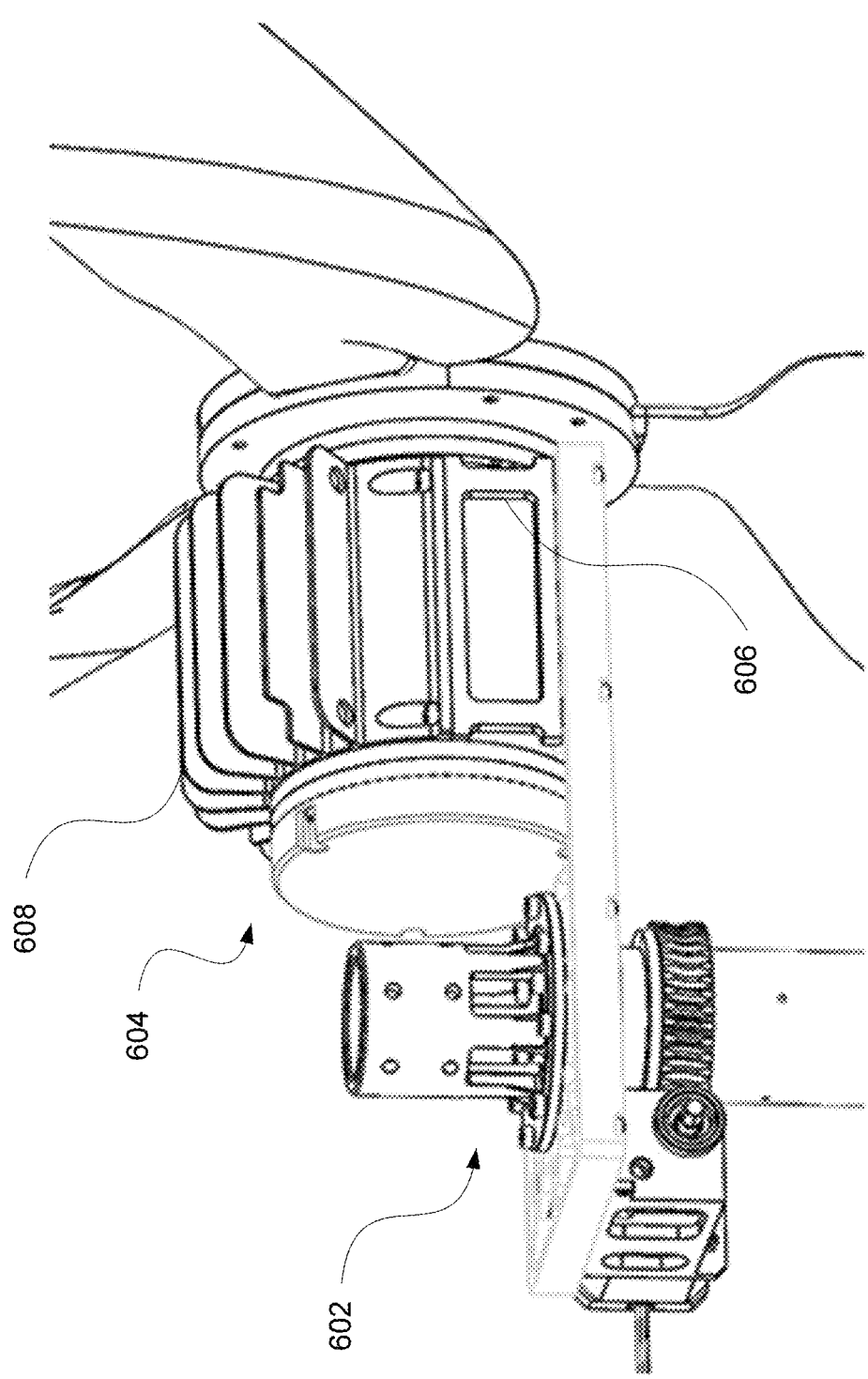
Fig. 6    600

800

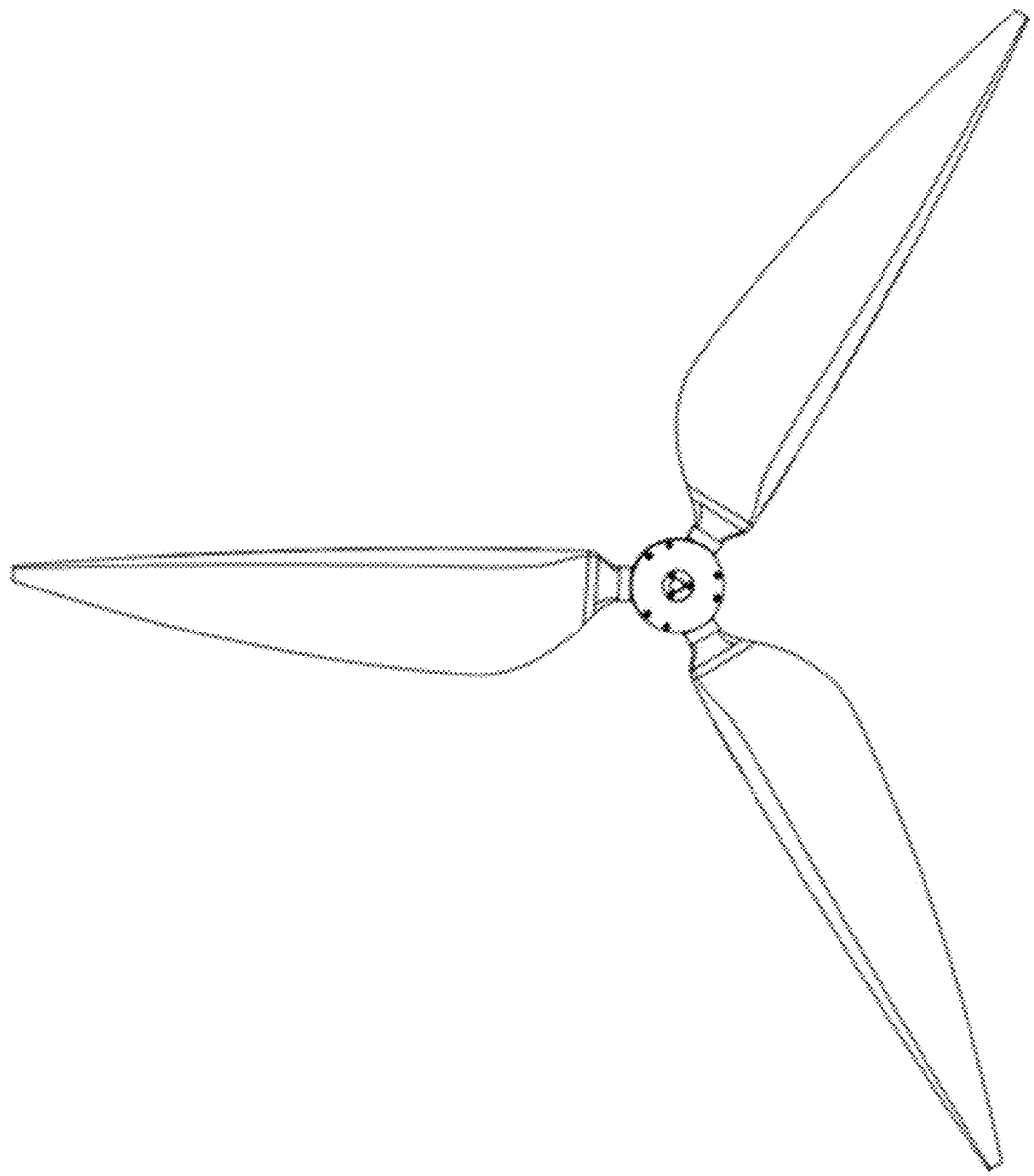
FIG. 10    1000

LATERAL PROPULSION SYSTEMS AND ARCHITECTURES FOR HIGH ALTITUDE BALLOONS

CROSS-REFERENCE TO RELATED APPLICATION

This application is related to application Ser. No. 16/513,795, filed Jul. 17, 2019, entitled Lateral Propulsion Propeller Assembly for High Altitude Balloons, filed Jul. 17, 2019, the entire disclosure of which is incorporated herein by reference.

BACKGROUND

Telecommunications connectivity via the Internet, cellular data networks and other systems is available in many parts of the world. However, there are many locations where such connectivity is unavailable, unreliable or subject to outages from natural disasters. Some systems may provide network access to remote locations or to locations with limited networking infrastructure via satellites or high altitude platforms located in the stratosphere. In the latter case, due to environmental conditions and other limitations, it is challenging to keep the platforms aloft and operational over a desired service area for long durations, such as days, weeks or more.

SUMMARY

Aspects of the technology provide lateral propulsion based systems that enable high altitude balloon platforms to spend more time over a desired region, reduce the return time to the desired region, and reduce fleet size.

According to one aspects, a propulsion system is provided for use with a balloon apparatus for lighter-than-air operation in the stratosphere. The balloon apparatus has a balloon envelope, a payload and a connecting member coupling the payload to the balloon envelope. The propulsion system comprises a propulsion assembly including a propeller, a motor assembly, a rotation module and an electronics module. The motor assembly is operatively coupled to the propeller assembly and is configured to rotate the propeller in a clockwise or counterclockwise direction about a first axis. The rotation module is connected to the motor assembly and is rotatably coupled to the connecting member of the balloon apparatus to provide at least partial rotation of the propulsion assembly about the connecting member along a second axis. The electronics module includes at least one processor configured to control actuation of the motor assembly and rotation of the rotation module.

In one example, the rotation module is configured to provide 360° rotation of the propeller assembly about the second axis. In another example, the second axis is perpendicular to the first axis. In a further example, the rotation module includes a slip ring element or cable rotation management mechanism rotatably coupled to an exterior surface of the connecting member.

In yet another example, the electronics module includes one or more sensors configured to detect information about the propulsion system or the balloon apparatus. The one or more sensors may be configured to detect a location and orientation of the propulsion system. In this case, the at least one processor may be configured to control actuation of the motor assembly in accordance with a location detected by the sensors to drive the balloon apparatus towards a target location or to maintain the balloon apparatus over the target location. The one or more sensors may include an inertial measurement unit configured to sense acceleration information associated with the propulsion system.

In another example, the at least one processor is configured to control actuation of the motor assembly according to either a rotational velocity control mode or a power control mode.

In a further example, the propulsion system further comprises the balloon apparatus. Here, the system may include cable or wiring running along the connecting member between the payload and the balloon envelope, where the rotation module is rotatably coupled to an exterior surface of the connecting member. Alternatively or additionally, the propulsion system may further comprise a solar panel assembly coupled to the payload. Here, the payload and the solar panel assembly may be configured to rotate about the connecting member to align the solar panel assembly with the sun. In this case, the rotation module is configured to provide at least partial rotation of the propulsion system about the connecting member independent of rotation of the payload and the solar panel assembly about the connecting member.

In yet another example, the rotation module includes a rotation motor and a gear. The rotation motor is configured for control by the at least one processor of the electronics module to cause actuation of the gear. In a further example, the propeller assembly includes a central hub affixed to the propeller.

According to another example, the at least one processor of the electronics module comprises a lateral propulsion controller configured to: set a pointing direction of the propeller, manage rotation of the propeller, and determine when to turn the propeller on or off.

In a further example, the at least one processor of the electronics module includes a power usage controller configured to manage power subsystems of the electronics module. Here, the power subsystems may include one or more of an altitude control power subsystem, a bus power subsystem, a communication power subsystem, and a lateral propulsion power subsystem.

The motor assembly may be disposed between the propulsion assembly and the rotation module. The propulsion system may further include a motor tether coupling the motor assembly to the rotation module. In addition and/or alternatively, the propulsion may also include a safety tether securing the propulsion system to at least one of the balloon envelope, the payload or the connecting member.

BRIEF DESCRIPTION OF THE DRAWINGS

FIG. 6 illustrates a control assembly in accordance with aspects of the technology.

FIG. 10 illustrates an example three blade propeller in accordance with aspects of the technology.

DETAILED DESCRIPTION

Overview

The technology relates to lateral propulsion systems for balloon platforms designed to operate in the stratosphere. As explained below, example lateral propulsion systems employ a multi-bladed propeller arrangement to provide directional adjustments to the balloons movement with the wind. Such adjustments enhance the coverage and safety capabilities for the platforms in a fleet of balloon platforms. For instance, by employing a small amount of lateral propulsion at particular times, a given platform may stay on station over a desired service area for a longer period, or, if engaged early enough, may avoid undesired airspaces. The given platform may also be able to return to the desired service area more quickly using lateral propulsion to compensate against undesired wind effects. Using this approach for some or all of the platforms in the fleet may mean that the total number of platforms required to provide a given level of service may be significantly reduced as compared to a fleet that does not employ lateral propulsion.

Stratospheric high altitude balloon platforms may have a float altitude of between about 50,000-120,000 feet above sea level. At such heights, the density of the air is very low compared to ground level. For example, while the pressure at ground level is around 1,000 mb, the pressure in the lower stratosphere may be on the order of 100 mb and the pressure in the upper stratosphere may be on the order of 1 mb. The temperature in the stratosphere varies with altitude, generally increasing with height. For instance, in the lower stratosphere the average temperature may be on the order of −40° C. to −50° C. or colder, while the average temperature in the upper stratosphere may be on the order of −15° C. to −5° C. or warmer. These and other environmental conditions in the stratosphere can be challenging for propulsion systems. The systems and arrangements discussed below are configured to effectively operate in such conditions.

Example Balloon Systems

Figure 1:
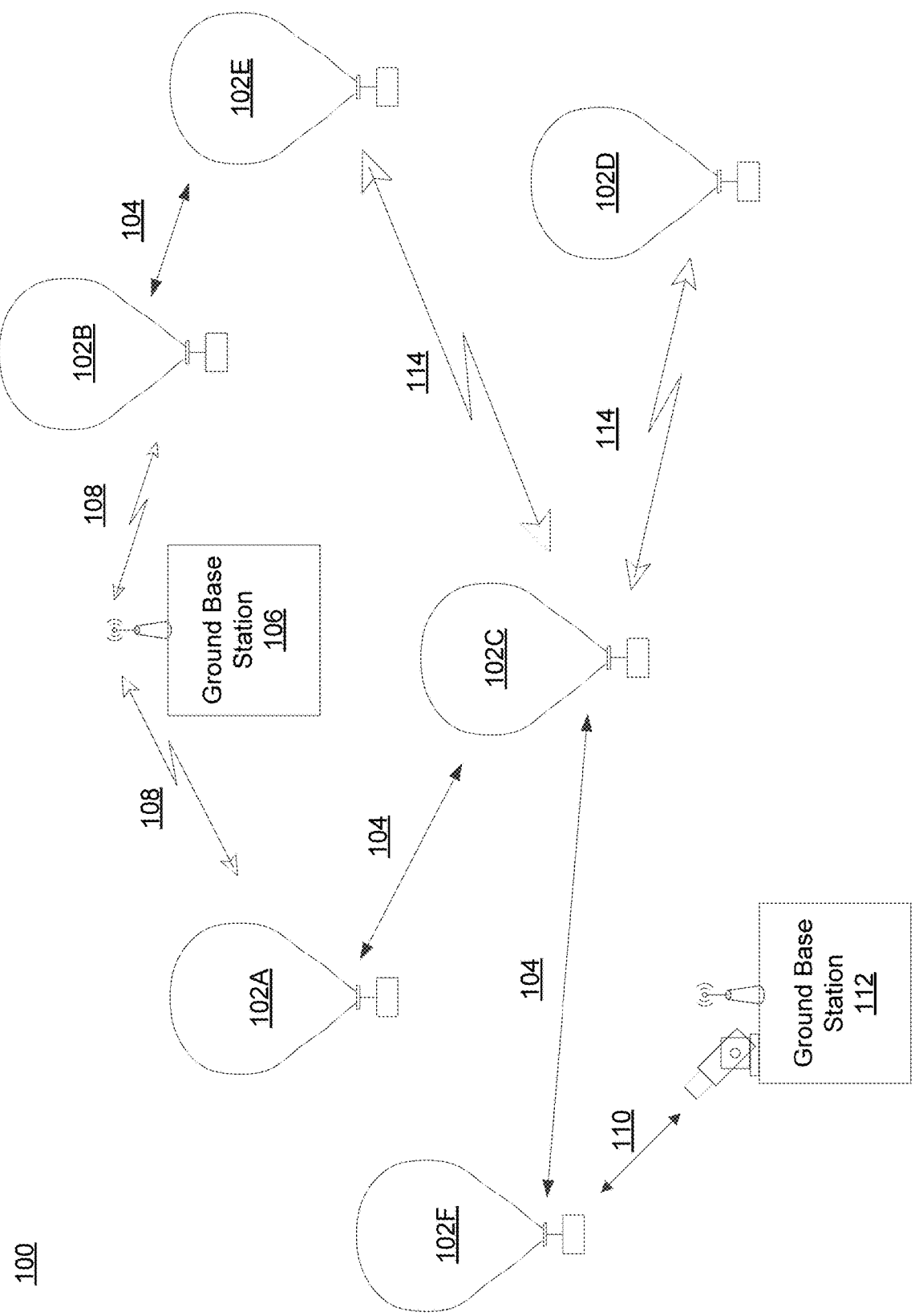
FIG. 1 is a functional diagram of an example system in accordance with aspects of the disclosure.

FIG. 1 depicts an example system 100 in which a fleet of the balloon platforms described above may be used. This example should not be considered as limiting the scope of the disclosure or usefulness of the features described herein. System 100 may be considered a balloon network. In this example, balloon network 100 includes a plurality of devices, such as balloons 102A-F as well as ground-base stations 106 and 112. Balloon network 100 may also include a plurality of additional devices, such as various computing devices (not shown) as discussed in more detail below or other systems that may participate in the network.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon that directly communicates with station 112.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions using winds and altitude control or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of FIG. 1 may be high-altitude balloons that are deployed in the stratosphere. As an example, in a high altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. And as discussed below, lateral propulsion may also be employed to affect the balloon's path of travel.

Figure 2:
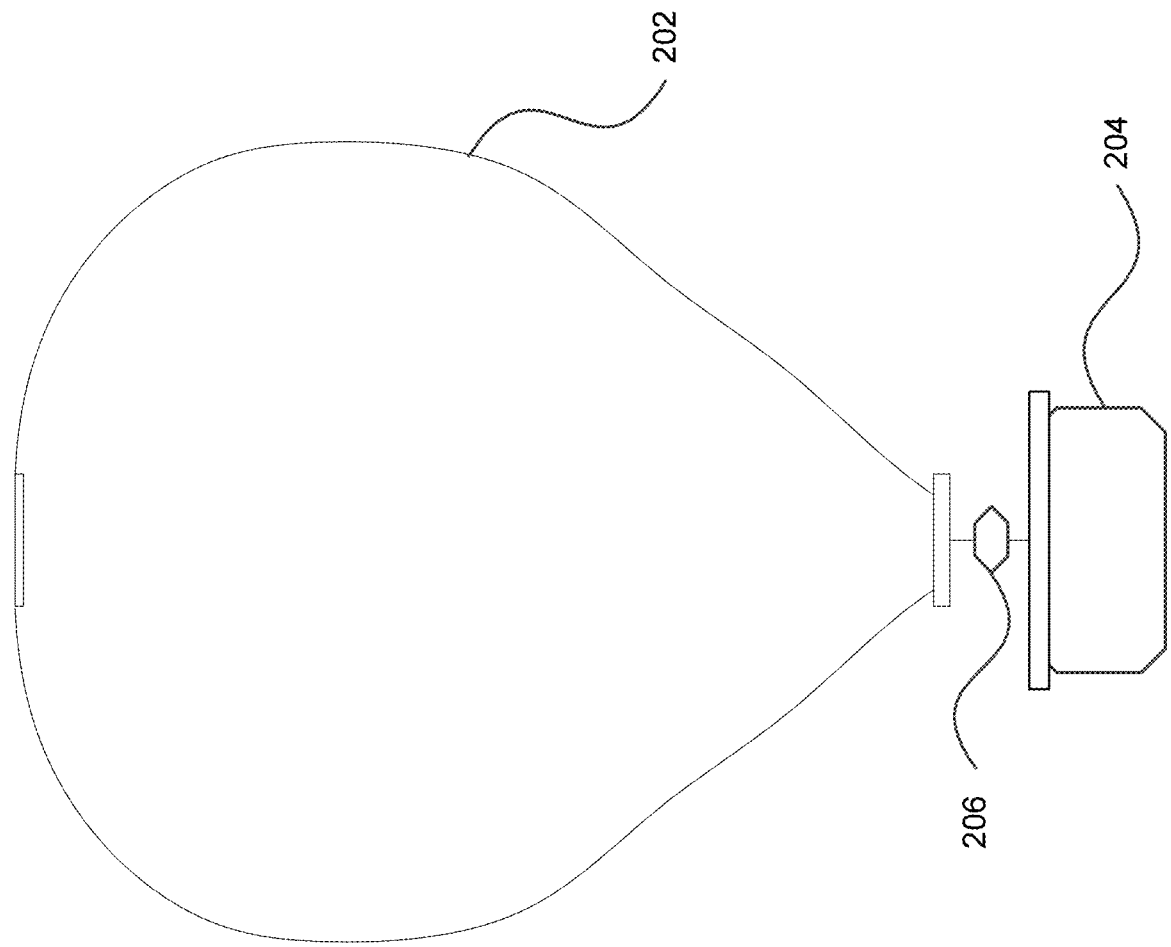
FIG. 2 illustrates a balloon configuration in accordance with aspects of the disclosure.

In an example configuration, the high altitude balloon platforms include an envelope and a payload, along with various other components. FIG. 2 is one example of a high-altitude balloon 200, which may represent any of the balloons of FIG. 1. As shown, the example balloon 200 includes an envelope 202, a payload 204 and a termination (e.g., cut-down & parachute) device 206.

The envelope 202 may take various shapes and forms. For instance, the envelope 202 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 202 may vary depending upon the particular implementation. Additionally, the envelope 202 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 3:
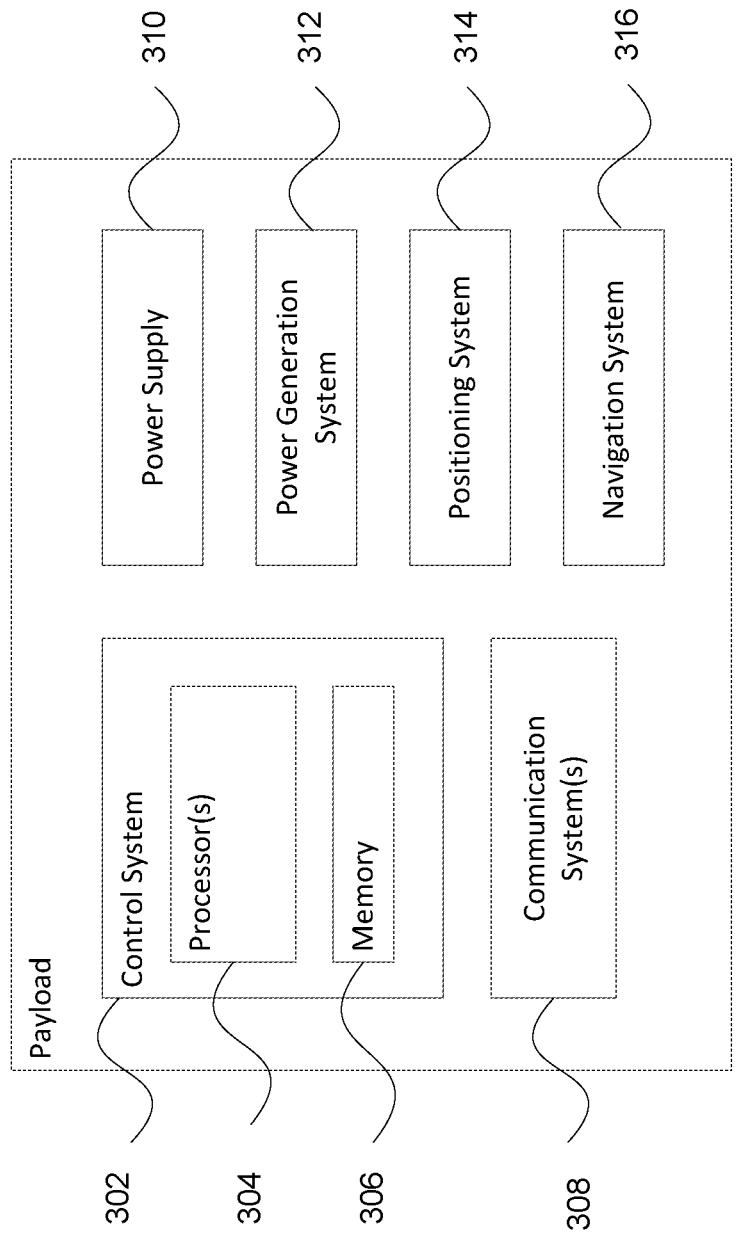
FIG. 3 is an example payload arrangement in accordance with aspects of the disclosure.

According to one example shown in FIG. 3, a payload 300 of a balloon platform includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 304 can include any conventional processors, such as a commercially available CPU. Alternatively, each processor can be a dedicated component such as an ASIC, controller, or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown)

The payload 300 is illustrated as also including a power supply 310 to supply power to the various components of balloon. The power supply 310 could include one or more rechargeable batteries or other energy storage systems like capacitors or regenerative fuel cells. In addition, the balloon 300 may include a power generation system 312 in addition to or as part of the power supply. The power generation system 312 may include solar panels, stored energy (hot air), relative wind power generation, or differential atmospheric charging (not shown), or any combination thereof, and could be used to generate power that charges and/or is distributed by the power supply 310.

The payload 300 may additionally include a positioning system 314. The positioning system 314 could include, for example, a global positioning system (GPS), an inertial navigation system, and/or a star-tracking system. The positioning system 314 may additionally or alternatively include various motion sensors (e.g., accelerometers, magnetometers, gyroscopes, and/or compasses). The positioning system 314 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 300 may include a navigation system 316 separate from, or partially or fully incorporated into control system 302. The navigation system 316 may implement station-keeping functions to maintain position within and/or move to a position in accordance with a desired topology or other service requirement. In particular, the navigation system 316 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the high-altitude balloon. In other embodiments, specific balloons may be configured to compute altitudinal and/or lateral adjustments for other balloons and transmit the adjustment commands to those other balloons.

Figure 4:
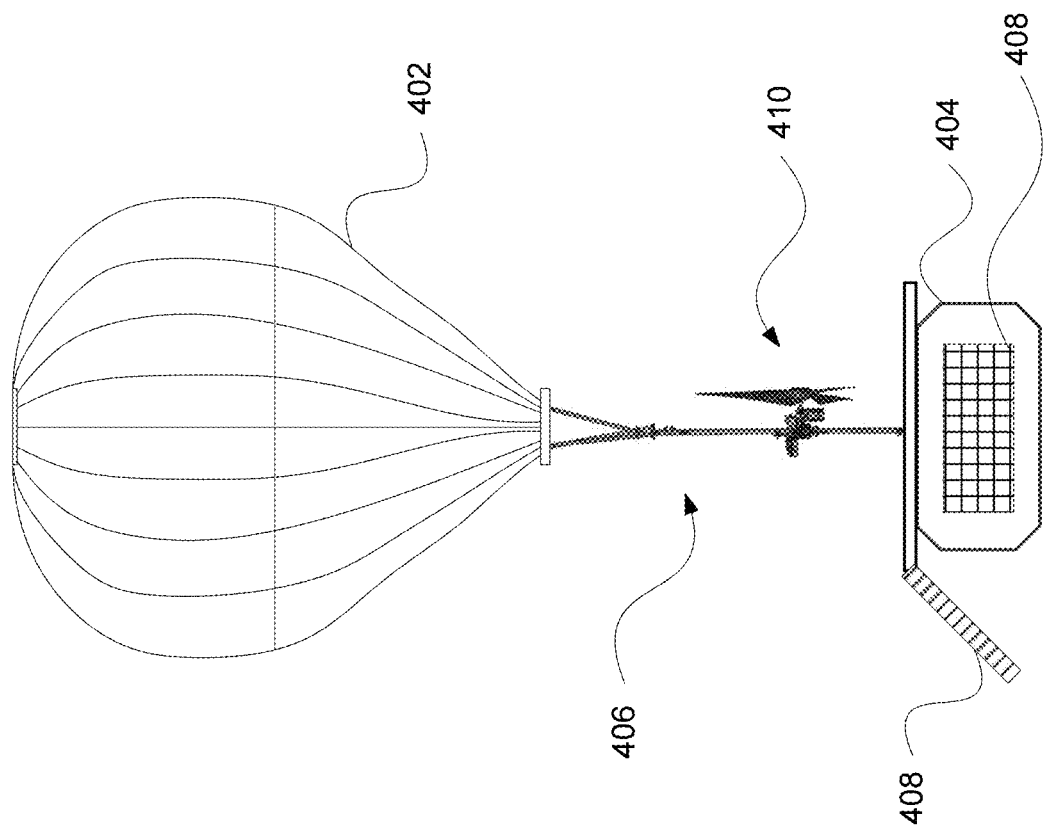
FIG. 4 is an example of a balloon platform with lateral propulsion in accordance with aspects of the disclosure.

In order to effect lateral positions or velocities, the platform includes a lateral propulsion system. FIG. 4 illustrates one example configuration 400 of a balloon platform with propeller-based lateral propulsion, which may represent any of the balloons of FIG. 1. As shown, the example 400 includes an envelope 402, a payload 404 and a down connect member 406 disposed between the envelope 402 and the payload 404. Cables or other wiring between the payload 404 and the envelope 402 may be run within the down connect member 406. One or more solar panel assemblies 408 may be coupled to the payload 404 or another part of the balloon platform. The payload 404 and the solar panel assemblies 408 may be configured to rotate about the down connect member 406 (e.g., up to 360° rotation), for instance to align the solar panel assemblies 408 with the sun to maximize power generation. Example 400 also illustrates a lateral propulsion system 410. While this example of the lateral propulsion system 410 is one possibility, the location could also be fore and/or aft of the payload section 404, or fore and/or aft of the envelope section 402, or any other location that provides the desired thrust vector. Details of the lateral propulsion system 410 are discussed below.

Example Configurations

Figure 5B:
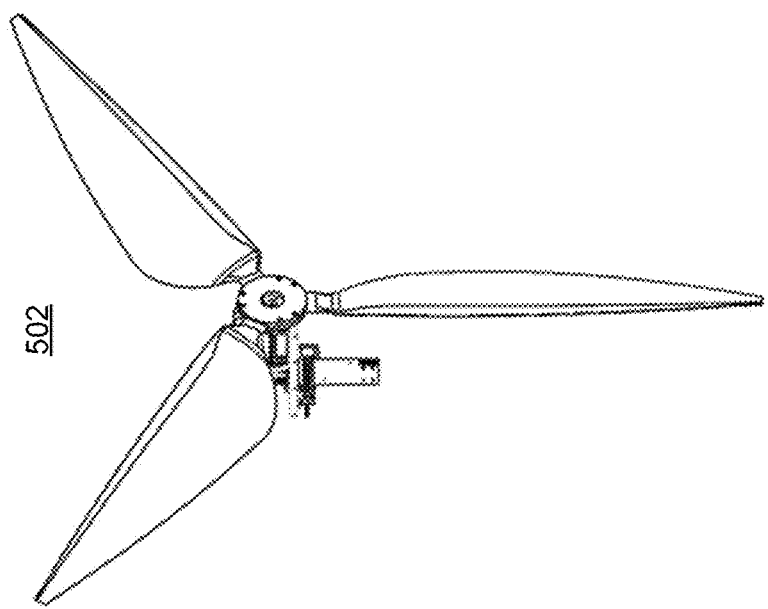
FIGS. 5A-B illustrate an example lateral propulsion system according to aspects of the technology.
Figure 5A:
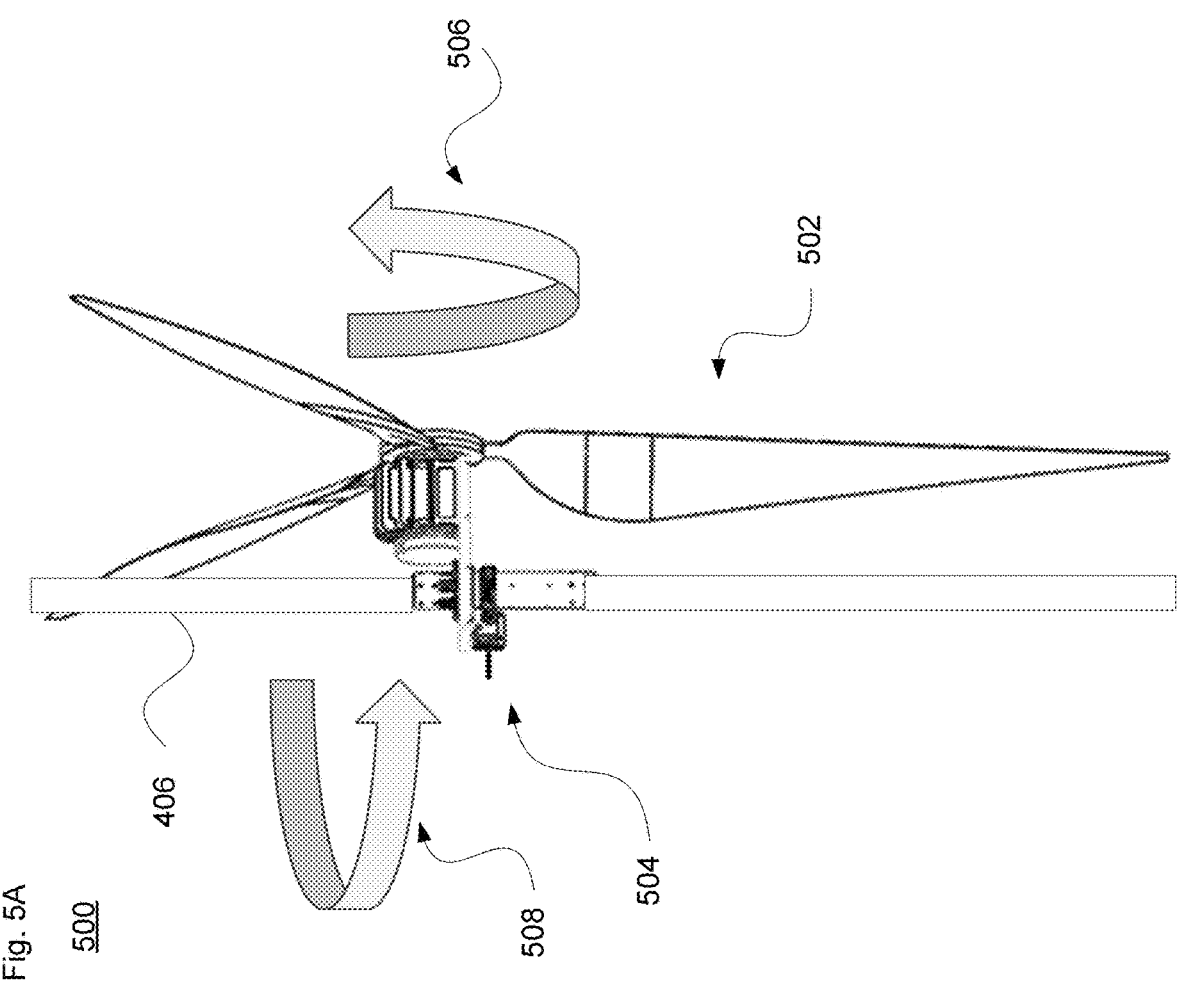

FIG. 5A illustrates an example 500 of the lateral propulsion system 410 of FIG. 4. As shown, example 500 includes a propeller assembly 502 (FIG. 5B) affixed to a control assembly 504, for example via a support plate. The control assembly 504 is configured to manage operation of the propeller assembly 502, including setting its pointing direction, speed of rotation and determining when to turn on the propeller and for how long. The propeller of the propeller assembly 502 may be arranged generally parallel to the down connect member 406, and is able to rotate in either a clockwise or counterclockwise direction as shown by arrow 506. The control assembly 504 is rotatable about the down connect member 406 (e.g., up to 360° rotation) as shown by arrow 508, changing the pointing direction of the propeller assembly 502 in order to change the lateral direction of force on the balloon platform.

While this configuration or other similar configurations gives the lateral propulsion system 410 two degrees of operational freedom, additional degrees of freedom are possible with other pointing mechanisms or air-ducting mechanisms. This flexible thrusting approach may be used to help counteract continually changing wind effects. Rotation of the control assembly 504 and propeller assembly 502 about the down connect member 406 is desirably independent of rotation of the solar panel assemblies (and/or payload) about the down connect member 406.

FIG. 6 provides an enlarged view 600 of the control assembly 504 of FIG. 5, with the down connect member 406 omitted for clarity. The control assembly may include an electronics module (not shown), a coupling member 602 such as a slip ring to provide power and data across a rotating interface, a propeller motor assembly 604 and optionally a force sensor 606. The example slip ring design depicted by coupling member 602 could also be an assembly of connected wires, for example in a loose helix, with the ability to flex over wide rotation range, greater than 360 degrees, and provide data and power across that moving interface. The propeller blades themselves are shown truncated and are discussed further below. The payload or the lateral propulsion system or both may have on-board sensors (e.g., differential GPS or DGPS) to provide accurate attitude and/or position and velocity measurements, enabling highly accurate pointing of the propeller in an absolute direction as well as relative to the payload direction. These sensors are also able to provide measurement of the balloon platform's lateral speed. The propeller motor 604 is configured to rotate the propeller in a clockwise or counterclockwise direction, with or without additional gearing. The propeller motor 604 may be brushless, which can generate more torque than a brush-type motor. By way of example, the brushless motor may be a 1000W motor, which is capable of rotating the propeller at up to 2500 rpm or more. The motor may employ a cooling system, for instance using cooling fins 608 or air ducts to remove excess heat from the motor or electronics. As discussed further below, the system may only need to drive the propeller to achieve a balloon lateral speed of between 1-15 m/s in order to significantly increase the ability of the balloon to stay on or return to station. The speed may be dependent on the location of interest, wind currents at a particular location or altitude, season/time of year, time of day, and/or other factors.

Figure 7:
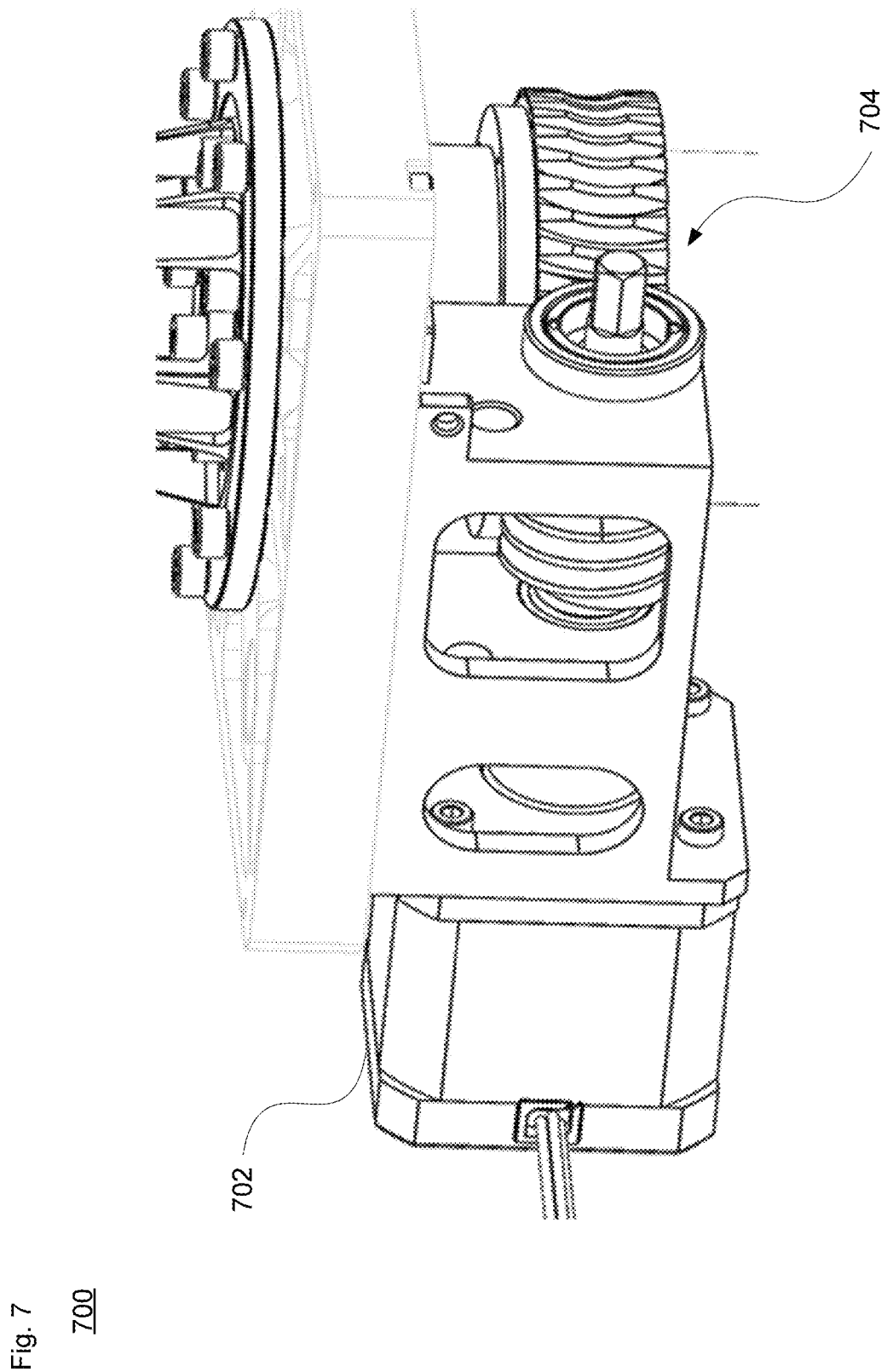
FIG. 7 illustrates an example an example rotational member in accordance with aspects of the technology.

The coupling member 602 is configured to enable unrestricted and continuous 360° rotation of the propeller and the entire lateral propulsion system 410. Other configurations besides a slip ring are possible for providing power and data across a moving interface, for example a series of flexible wires in a helix with fixed hard stops beyond 360 degrees (or more or less). Periodic unwinding of a helix-wire system may become necessary. FIG. 7 is an enlarged view 700 of an example rotational mechanism. Rotation to achieve the desired pointing direction is accomplished via motor 702 (such as a stepper or brushless DC motor) that drives a worm gear 704, which enables the assembly to rotate about the down connect member. Rotation and pointing of the propeller drive could be accomplished with many different configurations of motors and gears or other mechanisms.

Figure 8:
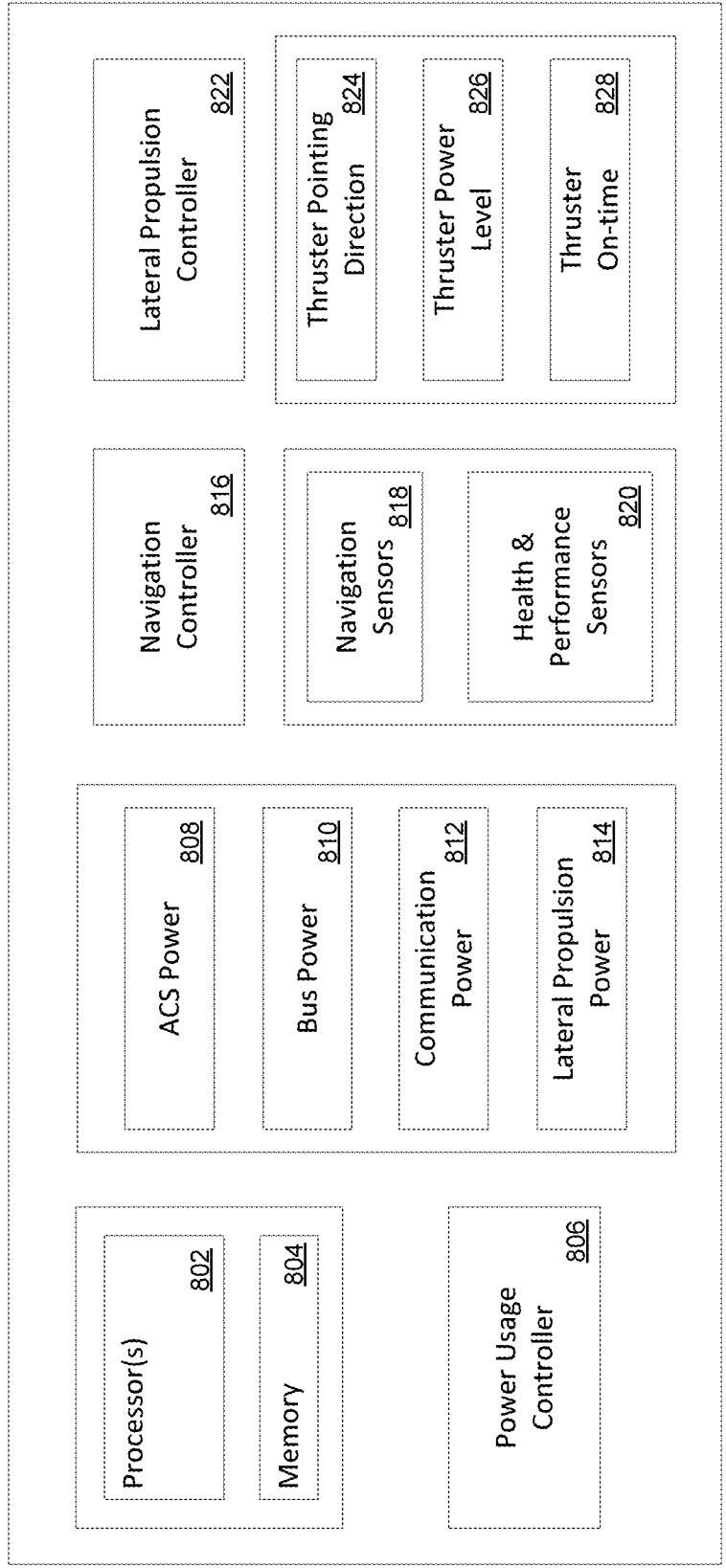
FIG. 8 is a block diagram of an example electronics module in accordance with aspects of the disclosure.

An exemplary block diagram of electronics module 800 is illustrated in FIG. 8. A CPU, controller or other types of processor(s) 802, as well as memory 804, may be employed within the electronics module 800 to manage aspects of the lateral propulsion system. A power usage controller 806 may be employed to manage various power subsystems of the electronics module, including for the altitude control system power 808, bus power 810, communication power 812 and lateral propulsion power 814. The power usage controller 806 may be separate from or part of the processor(s) 802.

A navigation controller 816 is configured to employ data obtained from onboard navigation sensors 818, including an inertial measurement unit (IMU) and/or differential GPS, received data (e.g., weather information), and/or other sensors such as health and performance sensors 820 (e.g., a force torque sensor) to manage operation of the balloon's systems. The navigation controller 816 may be separate from or part of the processor(s) 802. The navigation controller works with system software (e.g., Machine Learning algorithms), ground controller commands, and health & safety objectives of the system (e.g., battery power, temperature management, electrical activity, etc.) and helps decide courses of action. The decisions based on the sensors and software may be to save power, improve system safety (e.g., increase heater power to avoid systems from getting too cold during stratospheric operation) or divert power to altitude controls or divert power to lateral propulsion systems. When decisions are made to activate the lateral propulsion system, the navigation controller then leverages sensors for position, wind direction, altitude and power availability to properly point the propeller and to provide a specific thrust condition for a specific duration or until a specific condition is reached (a specific velocity or position is reached, while monitoring and reporting overall system health, temperature, vibration, and other performance parameters). In this way, the navigation controller can continually optimized the use of the lateral propulsion systems for performance, safety and system health. Upon termination of a flight, the navigation controller can engage the safety systems (for example propeller brake) to prepare the system to descend, land, and be recovered safely.

Lateral propulsion controller 822 is configured to continuously control the propeller's pointing direction, manage speed of rotation, power levels, and determine when to turn on the propeller or off, and for how long. The lateral propulsion controller 822 thus oversees thruster pointing direction 824, thruster power level 826 and thruster on-time 828 modules. The lateral propulsion controller 822 may be separate from or part of the processor(s) 802. Processor software or received human controller decisions may set priority on what power is available for lateral propulsion functions (e.g., using lateral propulsion power 814). The navigation controller then decides how much of that power to apply to the lateral propulsion motors and when (e.g., using thruster power level 826). In this way, power optimizations occur at the overall system level as well as at the lateral propulsion subsystem level. This optimization may occur in a datacenter on the ground or locally onboard the balloon platform.

The lateral propulsion controller 822 is able to control the propeller motor 604 (FIG. 6) so the propeller assembly may operate in different modes. Two example operational modes are: power control or rotational velocity control. The electronics module may store data for both modes and the processor(s) of the control assembly may manage operation of the propeller motor 604 in accordance with such data. For instance, the processor(s) may use the stored data to calculate or control the amount of power or the rotational propeller velocity needed to achieve a given lateral speed. The lateral propulsion controller 822 is able to control the propeller motor 604 (FIG. 6) so the propeller assembly through various motor control methods, for example torque or motor rotational speed control. These control methods may be wrapped by one or more additional control methods to achieve the high level goal of controlling power applied to the system, rotational speed of the system, or lateral speed of the system. The electronics module may store data for all modes and the processor(s) of the control assembly may manage operation of the propeller motor 604 in accordance with such data. For instance, the processor(s) may use the stored data to calculate the amount of current needed to achieve a given lateral speed. The processor(s) may also correlate the amount of torque required to yield a particular speed in view of the altitude of the balloon platform.

The processor(s) may control the propeller motor 604 continuously for a certain period of time, or may cycle the propeller motor 604 on and off for selected periods of time, e.g., using pulse width modulation (PWM). This latter approach may be done for thermal regulation of the propeller motor 604. For instance, the propeller may be actuated for anywhere from 1 second to 5 minutes (or more), and then turned off to allow for motor cooling. This may be dependent on the thermal mass available to dissipate heat from the motor.

The power required to generate a given lateral speed is proportional to the speed cubed. High altitude vehicles may have limited power availability, resulting in a tradeoff between speed and power consumption. Lower power consumption is desirable, because it enables the lateral propulsion system to be used for longer durations. One approach is to use a larger diameter propeller, which is generally more power efficient for the lateral velocities achievable with a balloon platform.

A temperature sensor (not shown) may also be included with the propeller motor 604, for instance as one of the health and performance sensors, because as noted above this component can generate significant heat. The processor(s) may employ the temperature sensor to cease actuation or reduce operation of the propeller when the detected heat exceeds a threshold level. The temperature sensor can also be used by the processor(s) when driving the propeller motor 604 via PWM or another technique.

Figure 9:
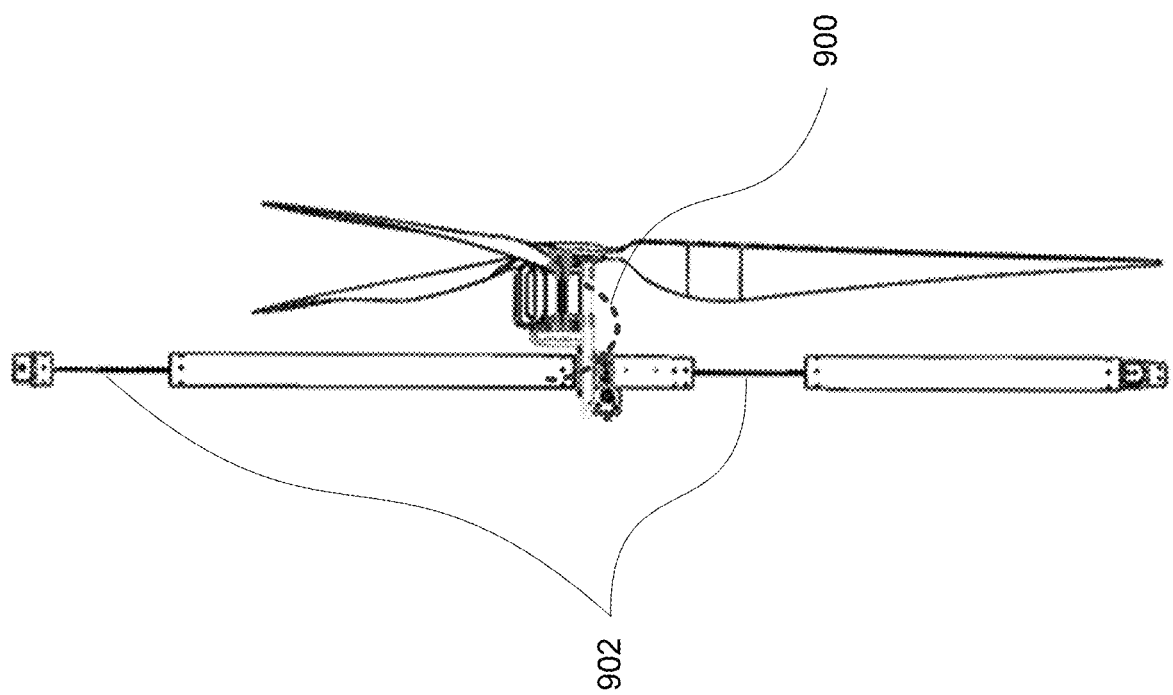
FIG. 9 illustrate examples of safety tether configurations in accordance with aspects of the technology.

The lateral propulsion system may also employ one or more safety tethers to secure components in case of failure or damage. For instance, FIG. 9 illustrates a motor tether 900 in dashed lines that couples the propeller motor assembly to the slip ring member. And at least one safety tether 902 may be employed to couple the overall lateral propulsion system to the balloon structure and/or to the payload, as shown in the figure. All of the tethers should be tied or otherwise secured away from the propeller. While not shown, a mechanical fuse and/or other cut-down equipment may be positioned along the down connect between the propulsion system and the balloon envelope to limit shock loads to the lateral propulsion and other equipment during high load events.

According to one approach, the propeller assembly would have as large a blade diameter as possible to maximize power efficiency and thrust. However, the size and weight of the propeller assembly may impact not only maximum float altitude but also launch of the balloon platform. In view of this, in some examples the overall propeller diameter may be on the order of 1-5 m, for instance 2 m or more or less. Configurations using multiple propeller blade assemblies are possible to help with performance, vibrations, controls, reliability, etc.

While a two blade propeller arrangement may be used, a three or more blade configuration 1000 as shown in FIG. 10 may provide more effective propulsion and vibration dynamics. By way of example, three blades can mitigate vibration more effectively than two blades, and can be easier to balance than two blades. In this example, the shape of the blades is designed to operate most efficiently at the low air-density operating altitude of the balloons.

The blades may be formed of different materials. For instance, a carbon fiber or other composite outer shell with a lightweight or hollow core could be used for each blade. However, this type of configuration can be cost prohibitive. Thus, a less expensive alternative may be desirable. One such alternative is to employ injection molded blades. At operational altitudes (e.g., 60 k feet or higher), low thrust is required so stiffness of the blades is not a significant issue and there are many inexpensive materials like plastics and fiber reinforced plastics that could be employed. Also, the centrifugal force resists bending of the blades. One or more weights could be added along each blade to balance it. For a longer blade, a carbon fiber or similar spar could be included for stiffness. The length of the spar would depend on the loads to be handled. In one example, the spar length is about ⅔ the length of the blade. The spar may be glued or otherwise bonded inside the two halves of the blade shell.

The type(s) of plastics employed for the blades may depend on the loads and speeds to be handled by the propeller assembly. For instance, the blades may be polycarbonate, or a glass fiber reinforced polycarbonate, e.g., a 50% long glass fiber reinforced polycarbonate. Given the example above in which the diameter of the propeller is approximately 1.5 m, the weight of the propeller assembly may be on the order of 1.0-1.5 Kg (e.g., +/−25%). In another example, when the diameter is approximately 2.25 m, the weight of the propeller assembly may be on the order of 3 Kg (e.g., +/−25%). In further examples, the weight may exceed 3 Kg.

Figure 11B:
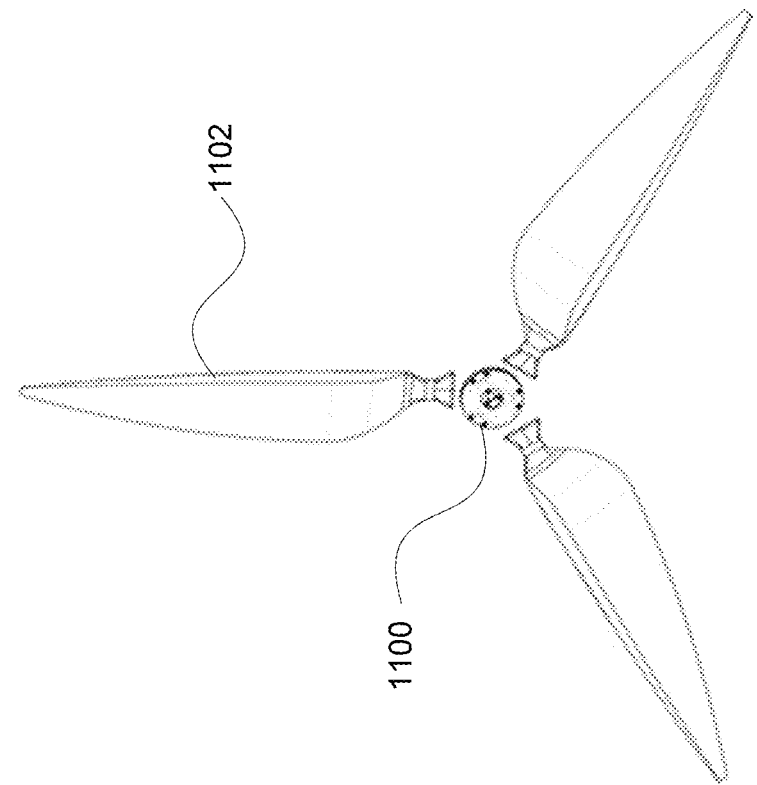
FIGS. 11A-B illustrate an example hub and propeller in accordance with aspects of the technology.
Figure 11A:
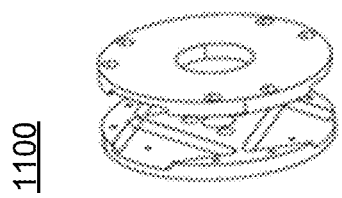

While the propeller assembly may include the blades in a unitary configuration (e.g., a single carbon fiber arrangement), the plastic blade configuration or other approach could employ separate blades. Here, the blades would be attached to a central hub. FIG. 11A illustrates one example of a hub 1100 and propeller blades connection 1101. FIG. 11B is an exploded view of the propeller blades 1102 separate from the hub 1100. In this example, the blades 1102 may be secured to the central hub 1100 by fasteners (e.g., bolts or screws). The central hub may be made of aluminum, for example. The blades 1102 are desirably constructed in a manner such that, if broken in an accident, blade parts resist separation from the hub assembly.

System Operation

This type of propulsion architecture may be used to provide an aerodynamically efficient balloon platform with upwards of 15 m/s lateral velocity vector adjustment. However, drag and maximum speed can be highly dependent on balloon tilt, shape, and size of the balloon. As the balloon envelope tilts, the drag increases, which may adversely impact system operation. Ligaments or tethers from the balloon envelope to the down connect member or other controls may help to counteract the drag.

Figure 12:
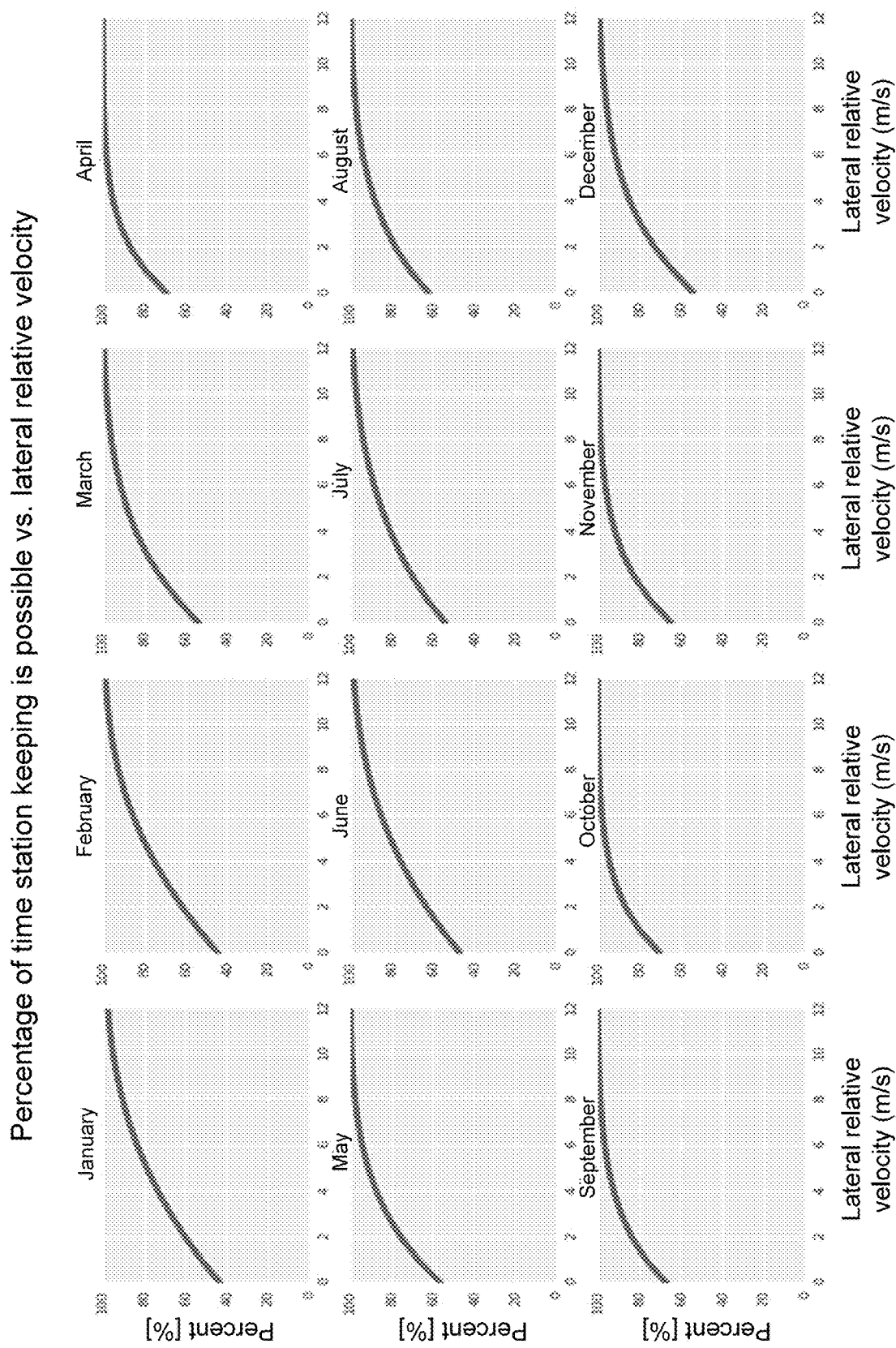
FIG. 12 is an exemplary set of monthly charts comparing station seeking time to wind velocity vector augmentation in accordance with aspects of the technology.

Notwithstanding any concerns regarding drag, small to moderate amounts of lateral propulsion can provide significant benefits for station-keeping, time to return to station and safety cases. For instance, FIG. 12 illustrates, for an example geographic location, the amount of time a balloon platform may remain on or return to station by controlling the lateral relative velocity, which is shown in a range of 0-12 m/s. This figure is broken into monthly plots and shows the high variability of the winds. As can be seen, without any lateral propulsion the platform is only likely to remain on (or return to) station 50-70% of the time using advanced altitude control alone. However, even moderate lateral control speeds on the order of 1-4 m/s may increase that station keeping percentage to 80-95% of the time or more. And at higher speeds, e.g., 5-8 m/s or more, the percentage of time goes even higher for most months.

Figure 13:
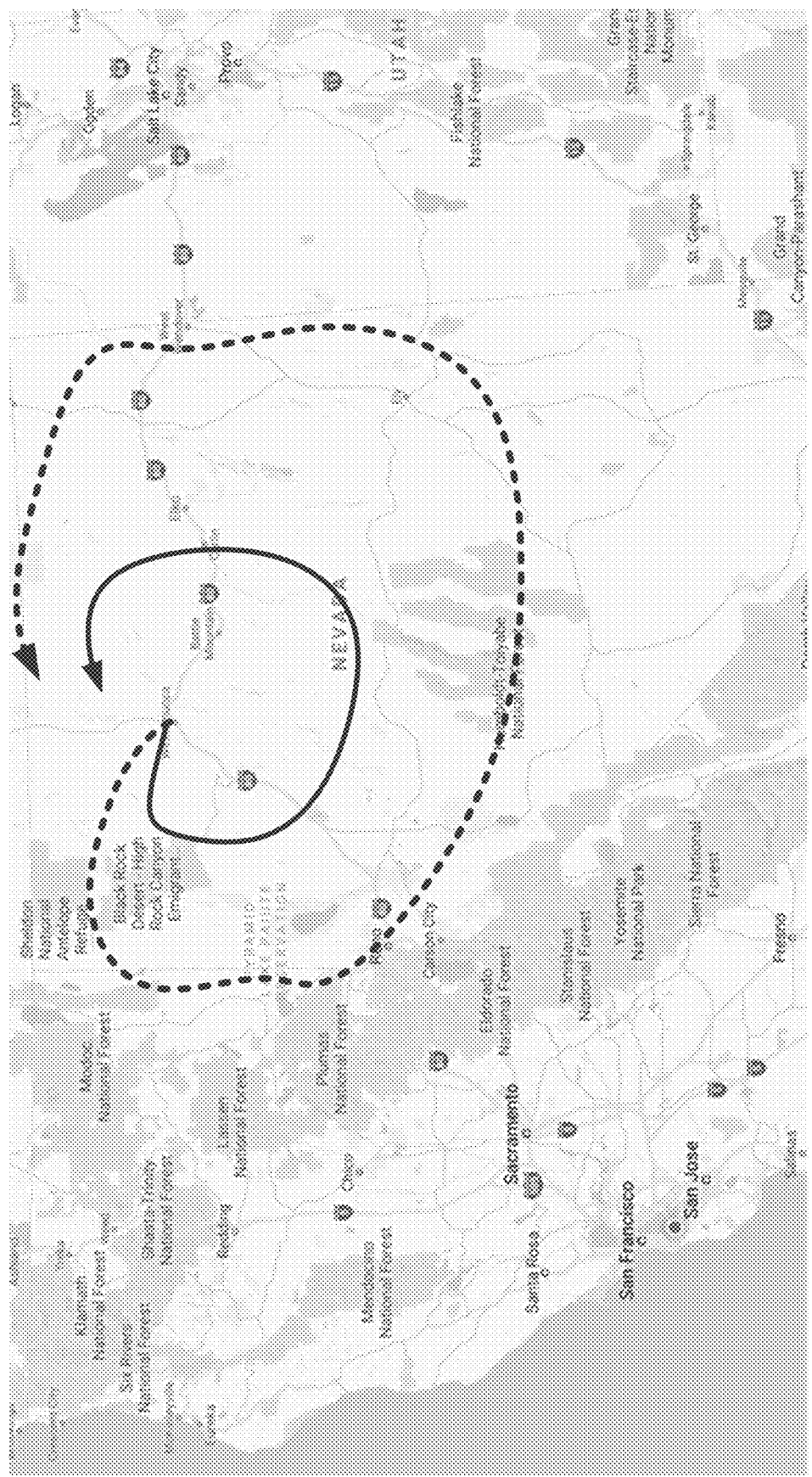
FIG. 13 illustrates an example of station keeping in accordance with aspects of the technology.

FIG. 13 illustrates one example of how lateral propulsion can assist with a return to station. Assume that the "station" is the city of Winnemucca Nev. Here, the dashed arrow shows a flight path for a balloon using altitude control alone, without lateral propulsion. The balloon may have a very large flight path that takes it very far away from the location of interest. During such times, one or more other balloons or other high altitude platforms (HAPs) may need to be employed to account for any gaps in coverage. In contrast, the solid arrow shows a much tighter flight path may be possible when lateral propulsion is employed. Here, the balloon may remain on station for longer periods, and may return to station much more quickly than without lateral propulsion. Thus, the balloon would be able to provide more coverage with less down time. This would mean that no or fewer additional balloons would be needed. As a result, there is less need to overprovision, and the total number of balloons in the fleet could be substantially reduced (e.g., by 30-50% or more).

Most of the foregoing examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as

The invention claimed is:

1. A propulsion system for use with a balloon apparatus for lighter-than-air operation in the stratosphere, the balloon apparatus having a balloon envelope, a payload and a connecting member coupling the payload to the balloon envelope, the propulsion system comprising:
a propeller assembly including:
at least one propeller; and
a motor assembly operatively coupled to the at least one propeller, the motor assembly configured to rotate the at least one propeller clockwise or counterclockwise about a first axis;
a support plate rotatably coupled with the connecting member proximate an end of the support plate, wherein the propeller assembly is coupled proximate to another end of the support plate, and the connecting member extends through the support plate;
a rotational mechanism coupled between the support plate and the connecting member, the rotational mechanism configured to rotate the propeller assembly and the support plate relative to the connecting member along a second axis; and
an electronics module, including at least one processor, configured to control rotation of the at east one propeller with the motor assembly and rotate the propeller assembly and support plate with the rotational mechanism independent of rotation of the payload about the connecting member.

2. The propulsion system of claim 1, wherein the rotational mechanism is configured to provide 360° rotation of the propeller assembly about the second axis.

3. The propulsion system of claim 1, wherein the second axis is perpendicular to the first axis.

4. The propulsion system of claim 1, wherein the rotational mechanism includes a slip ring element or wire rotation management mechanism rotatably coupled to an exterior surface of the connecting member.

5. The propulsion system of claim 1, wherein the electronics module includes one or more sensors configured to detect information about the propulsion system or the balloon apparatus.

6. The propulsion system of claim 5, wherein the one or more sensors detect at least one of a location and an orientation of the propulsion system.

7. The propulsion system of claim 1, wherein the at least one processor is configured to control actuation of the motor assembly in accordance with a location detected by at least one or more sensors to drive the balloon apparatus towards a target location or to maintain the balloon apparatus over the target location.

8. The propulsion system of claim 5, wherein the one or more sensors includes an inertial measurement unit configured to sense acceleration information associated with the propulsion system.

9. The propulsion system of claim 1, wherein the at least one processor is configured to control actuation of the motor assembly according to either a rotational velocity control mode or a power control mode.

10. The propulsion system of claim 1, further comprising the balloon apparatus.

11. The propulsion system of claim 10, further comprising:
cable or wiring running along the connecting member between the payload and the balloon envelope;
wherein the rotational mechanism is rotatably coupled to an exterior surface of the connecting member.

12. The propulsion system of claim 10, further comprising:
a solar panel assembly coupled to the payload, the payload and the solar panel assembly being configured to rotate about the connecting member to align the solar panel assembly with the sun;
wherein the rotational mechanism is configured to provide at least partial rotation of the propulsion system about the connecting member independent of rotation of both the payload and the solar panel assembly about the connecting member.

13. The propulsion system of claim 1, wherein the rotational mechanism includes a rotation motor and a gear, the rotation motor being configured for control by the at least one processor of the electronics module to cause actuation of the gear.

14. The propulsion system of claim 1, wherein the propeller assembly includes a central hub affixed to the propeller.

15. The propulsion system of claim 1, wherein the at least one processor of the electronics module comprises a lateral propulsion controller configured to:
set a pointing direction of the propeller;
manage rotation of the propeller; and
determine when to turn the propeller on or off.

16. The propulsion system of claim 1, wherein the at least one processor of the electronics module includes a power usage controller configured to manage power subsystems of the electronics module.

17. The propulsion system of claim 16, wherein the power subsystems include one or more of an altitude control power subsystem, a bus power subsystem, a communication power subsystem, and a lateral propulsion power subsystem.

18. The propulsion system of claim 1, further comprising a safety tether securing the propulsion system to at least one of the balloon envelope, the payload and the connecting member.

19. A balloon apparatus for stratospheric operation, the balloon apparatus comprising:
a balloon envelope;
a payload;
a connecting member coupling the payload to the balloon envelope, the connecting member extending along a first axis;
a propeller assembly rotatably coupled with the connecting member, the propeller assembly includes:
at least one propeller; and
a motor assembly operatively coupled to the propeller;
a support plate rotatably coupled with the connecting member, wherein the connecting member extends through the support plate, and at least a portion of the propeller assembly including the at least one propeller is coupled proximate an end of the support plate; and
a rotational mechanism coupled with the support plate and the connecting member, the rotational mechanism includes:
a motor;
at least one gear coupled between the support plate and the connecting member, and the at least one gear rotatably coupled to the connecting member; and wherein the at least one gear facilitates rotation of the propeller assembly, including the at least one propeller, with the support plate about the first axis; and an electronics module coupled to the rotational mechanism and the propeller assembly and configured to control rotation of each of the at least one propeller with the motor assembly and rotation of the rotational mechanism relative to the payload about the connecting member.

20. The balloon apparatus of claim 19 wherein the rotational mechanism includes a rotation motor, the rotation motor configured for control by at least one processor of the electronics module to cause actuation of the gear.

21. The balloon apparatus of claim 19 wherein the propeller assembly is aligned with the connecting member.

22. The balloon apparatus of claim 19 further comprising a navigation controller.

23. A propulsion system for use with a balloon apparatus for lighter-than-air operation in the stratosphere, the balloon apparatus comprising:
a balloon envelope;
a payload;
a connecting member coupling the payload to the balloon envelope, the connecting member includes:
a first part extending from the balloon envelope toward the payload; and
a second part extending from the payload toward the balloon envelope;
a support plate cantilevered from the connecting member and interposed between the first and second parts of the connecting member, wherein the support plate is rotatably coupled with at least one of the first and second parts of the connecting member;
a propulsion assembly includes:
a propeller assembly proximate to an end of the support plate; and
the propeller assembly includes at least one propeller; and
a control assembly coupled to the support plate, the control assembly configured to rotate the support plate in a specified direction relative to the payload and direct the at least one propeller in the specified direction.

24. The propulsion system of claim 23, wherein the control assembly further comprises an electronics module and a coupling member to provide power and data to the propeller assembly.

25. The propulsion system of claim 23, further comprising a rotational mechanism coupled with the support plate and the connecting member, the rotational mechanism includes:
a motor;
at least one gear coupled between the support plate and the connecting member, and at least one gear rotatably coupled to the connecting member; and
wherein, the at least one gear facilitates rotation of the support plate with the propeller assembly about the first axis; and
an electronics module coupled to the rotational mechanism and the propulsion assembly and configured to control rotation of each of the at least one propeller with the motor assembly and rotation of the rotational mechanism relative to the payload about the connecting member.

26. The propulsion system of claim 23 further comprising a navigation controller.

* * * * *

UNITED STATES PATENT AND TRADEMARK OFFICE
CERTIFICATE OF CORRECTION

PATENT NO. : 11,220,320 B2
APPLICATION NO. : 16/513782
DATED : January 11, 2022
INVENTOR(S) : Gagne et al.

It is certified that error appears in the above-identified patent and that said Letters Patent is hereby corrected as shown below:

In the Claims

In Column 13, Line 31, in Claim 1, delete "east" and insert --least-- therefor

Signed and Sealed this
Twenty-fourth Day of May, 2022

Katherine Kelly Vidal
*Director of the United States Patent and Trademark Office*